(12) United States Patent
Vozila et al.

(10) Patent No.: US 11,238,226 B2
(45) Date of Patent: Feb. 1, 2022

(54) SYSTEM AND METHOD FOR ACCELERATING USER AGENT CHATS

(71) Applicant: Nuance Communications, inc., Burlington, MA (US)

(72) Inventors: Paul Joseph Vozila, Arlington, MA (US); Peter Stubley, Beaconsfield (CA); Jean-Francois Beaumont, Verdun (CA); Ding Liu, Lexington, MA (US); William F. Ganong, III, Brookline, MA (US)

(73) Assignee: NUANCE COMMUNICATIONS, INC., Burlington, MA (US)

( * ) Notice: Subject to any disclaimer, the term of this patent is extended or adjusted under 35 U.S.C. 154(b) by 163 days.

(21) Appl. No.: 16/192,245

(22) Filed: Nov. 15, 2018

(65) Prior Publication Data
US 2020/0159827 A1     May 21, 2020

(51) Int. Cl.
*G06F 40/289*     (2020.01)
*G06F 40/35*     (2020.01)
*H04L 12/58*     (2006.01)

(52) U.S. Cl.
CPC ............ *G06F 40/289* (2020.01); *G06F 40/35* (2020.01); *H04L 51/04* (2013.01)

(58) Field of Classification Search
CPC .............................. G06F 40/289; G06F 40/35
See application file for complete search history.

(56) References Cited

U.S. PATENT DOCUMENTS

| | | | |
|---|---|---|---|
| 7,266,535 B1 | 9/2007 | Nelken et al. | |
| 10,664,527 B1 | 5/2020 | Henderson et al. | |
| 2006/0129409 A1* | 6/2006 | Mizutani | G06F 40/58 704/275 |
| 2006/0136227 A1* | 6/2006 | Mizutani | G10L 15/22 704/277 |
| 2008/0033937 A1 | 2/2008 | Cha et al. | |
| 2009/0245500 A1 | 10/2009 | Wampler | |
| 2011/0106527 A1 | 5/2011 | Chiu | |
| 2011/0288897 A1* | 11/2011 | Erhart | G06Q 10/06 705/7.13 |
| 2012/0076283 A1 | 3/2012 | Ajmera et al. | |
| 2012/0221323 A1* | 8/2012 | Sumita | G06F 40/45 704/3 |
| 2014/0044243 A1 | 2/2014 | Monegan et al. | |
| 2014/0143018 A1 | 5/2014 | Nies et al. | |

(Continued)

OTHER PUBLICATIONS

Kannan et al., "Smart Reply: Automated Response Suggestion or Email", ACM—KDD Aug. 2016, pp. 1-10.

(Continued)

*Primary Examiner* — Paras D Shah
(74) *Attorney, Agent, or Firm* — Brian J. Colandreo; Michael T. Abramson; Holland & Knight LLP

(57) ABSTRACT

A method, computer program product, and computer system for identifying, by a computing device, a model for predicting conversational phrases for a communication between at least a first user and a second user. The model may be trained based upon, at least in part, an attribute associated with the second user. At least one conversational phrase may be predicted for the communication between the first user and the second user. The at least one conversational phrase may be provided to the second user as an optional phrase to be sent to the first user.

20 Claims, 7 Drawing Sheets

(56) References Cited

U.S. PATENT DOCUMENTS

| | | | |
|---|---|---|---|
| 2015/0178371 A1* | 6/2015 | Seth | G06F 40/117 707/748 |
| 2015/0256675 A1* | 9/2015 | Sri | H04L 12/1827 379/265.09 |
| 2016/0037311 A1* | 2/2016 | Cho | G06Q 10/00 455/466 |
| 2016/0098988 A1 | 4/2016 | Goussard et al. | |
| 2016/0330144 A1* | 11/2016 | Dymetman | H04L 51/02 |
| 2016/0359771 A1 | 12/2016 | Sridhar | |
| 2017/0180294 A1* | 6/2017 | Milligan | H04L 51/02 |
| 2017/0277667 A1* | 9/2017 | Weston | G06F 16/3329 |
| 2017/0351342 A1* | 12/2017 | Kandur Raja | G06F 3/04886 |
| 2018/0113852 A1* | 4/2018 | Song | G06F 40/163 |
| 2018/0239770 A1* | 8/2018 | Ghotbi | G06F 16/338 |
| 2018/0307672 A1* | 10/2018 | Akkiraju | G10L 15/22 |
| 2019/0227822 A1* | 7/2019 | Azmoon | G06Q 30/016 |
| 2019/0311245 A1* | 10/2019 | Zhang | G06N 3/063 |
| 2020/0098366 A1* | 3/2020 | Chakraborty | G10L 15/1815 |

OTHER PUBLICATIONS

Liu et al., "End-to-End Optimization of Task-Oriented Dialogue Model with Deep Reinforcement Learning", http://alborz-geramifard.com/workshops/nips17-Conversational-AI/Papers/17nipsw-cai-e2e-optimization.pdf, pp. 1-6.

Perez, Sarah, "A Google R&D team wants to bring Smart Reply to all your chat apps", https://techcrunch.com/2018/02/13/a-google-rd-team-wants-to-bring-smart-reply-to-all-your-chat-apps, (Feb. 13, 2018; downloaded Sep. 27, 2018), pp. 1-10.

Serban, et al., "A Hierarchical Latent Variable Encoder-Decoder Model for Generating Dialogues", https://arxiv.org/pdf/1605.06069.pdf, (Jun. 14, 2016), pp. 1-15.

Guu, K. et al., "REALM: Retrieval-Augmented Language Model Pre-Training", arZXiv:2002.08909v1, [cs.CL] Feb. 10, 2020, pp. 1-12.

Humeau, S. et al., "Poly-encoders: Architectures and pre-training strategies for fast and accurate multi-sentencing scoring", arXiv:1905.01969v4, [cs:CL], Mar. 25, 2020, published as a conference paper at ICLR 2020, pp. 1-14.

Khandelwal, U. et al., "Generalization Through Memorization: Nearest Neighbor Language Models", arXiv:1911.00172v2, [cs.CL], Feb. 15, 2020, published as a conference paper at ICLR 2020, pp. 1-13.

International Search Report and Written Opinion issued in related International Application No. PCT/US2019/061772 dated Jan. 22, 2020; 10 pages.

[No Author], Nuance Communications, Inc. "Superior assisted service with Nuance Live Chat", Feb. 28, 2018, Retrieved on Jan. 3, 2020 from <https://www.nuance.com/content/dam/nuance/en_us/collateral/enterprise/data-sheet/ds-nuance-live-chatv2-en-US.pdf> entire document, 2 pages.

International Search Report and Written Opinion issued in related International Application No. PCT/US2021/045426 dated Nov. 4, 2021.

* cited by examiner

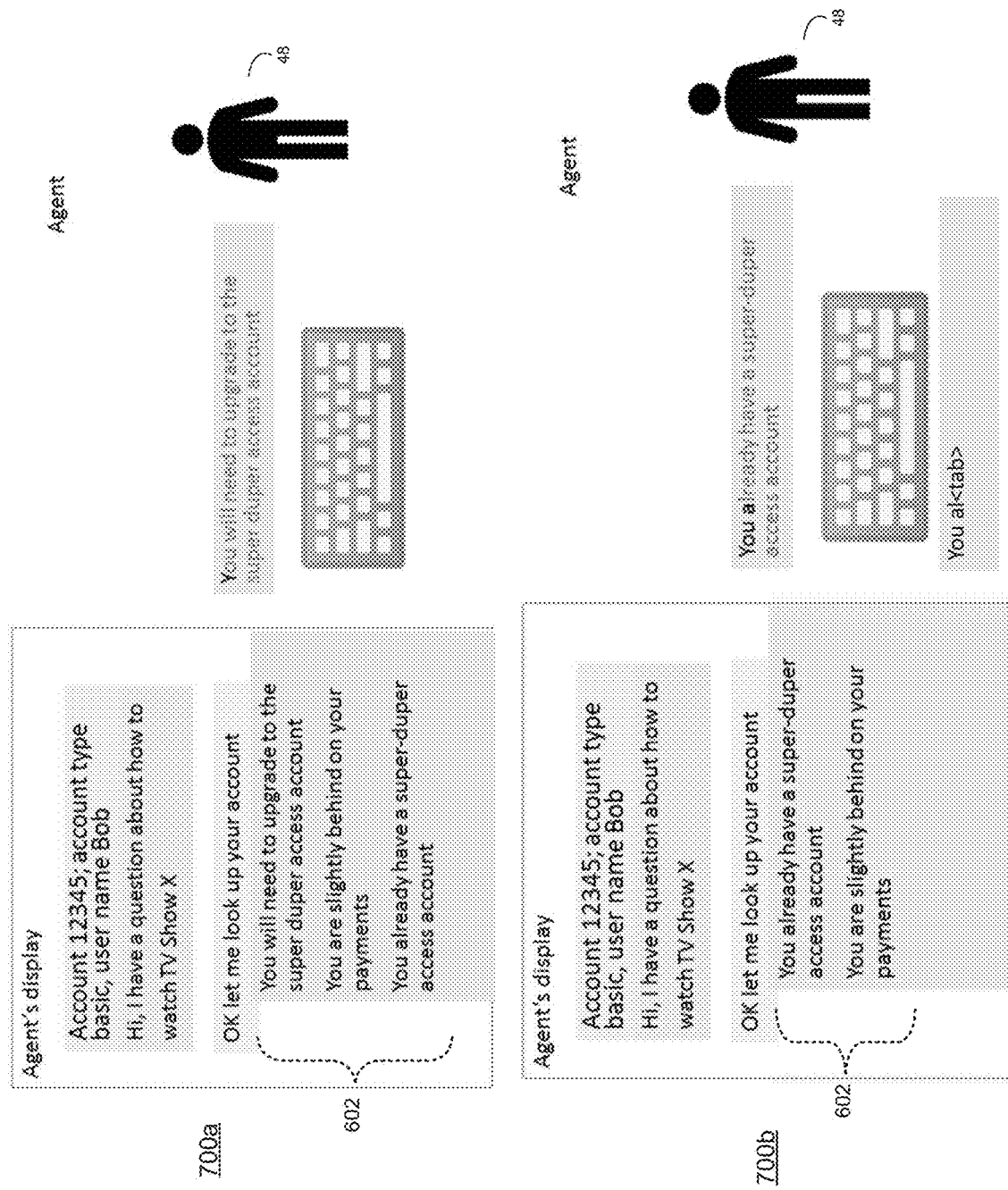

SYSTEM AND METHOD FOR ACCELERATING USER AGENT CHATS

BACKGROUND

Instant messaging, or "chats" is a convenient method of communication between multiple people. Companies have adopted this technology to help address questions that a customer may have without requiring a phone call or email exchange with a customer service "agent." For example, a customer may go to a company's web site, and a pop-up may appear asking if the customer wishes to communicate with an agent to ask a question. Once the user selects the option to communicate with the agent, a chat may appear where the customer and agent are then connected to begin a conversation.

BRIEF SUMMARY OF DISCLOSURE

In one example implementation, a method, performed by one or more computing devices, may include but is not limited to identifying, by a computing device, a model for predicting conversational phrases for a communication between at least a first user and a second user. The model may be trained based upon, at least in part, an attribute associated with the second user. At least one conversational phrase may be predicted for the communication between the first user and the second user. The at least one conversational phrase may be provided to the second user as an optional phrase to be sent to the first user.

One or more of the following example features may be included. The communication between the first user and the second user may include a real-time instant message. The attribute may include an enterprise associated with the second user. The attribute may include one or more characteristics associated with the second user. The attribute may include communication logs of one or more prior communications of the second user. Predicting the at least one conversational phrase may include predicting at least one conversational phrase of the first user before the first user has sent the at least one conversational phrase to the second user. The attribute may include seniority of the second user.

In another example implementation, a computing system may include one or more processors and one or more memories configured to perform operations that may include but are not limited to identifying a model for predicting conversational phrases for a communication between at least a first user and a second user. The model may be trained based upon, at least in part, an attribute associated with the second user. At least one conversational phrase may be predicted for the communication between the first user and the second user. The at least one conversational phrase may be provided to the second user as an optional phrase to be sent to the first user.

One or more of the following example features may be included. The communication between the first user and the second user may include a real-time instant message. The attribute may include an enterprise associated with the second user. The attribute may include one or more characteristics associated with the second user. The attribute may include communication logs of one or more prior communications of the second user. Predicting the at least one conversational phrase may include predicting at least one conversational phrase of the first user before the first user has sent the at least one conversational phrase to the second user. The attribute may include seniority of the second user.

In another example implementation, a computer program product may reside on a computer readable storage medium having a plurality of instructions stored thereon which, when executed across one or more processors, may cause at least a portion of the one or more processors to perform operations that may include but are not limited to identifying a model for predicting conversational phrases for a communication between at least a first user and a second user. The model may be trained based upon, at least in part, an attribute associated with the second user. At least one conversational phrase may be predicted for the communication between the first user and the second user. The at least one conversational phrase may be provided to the second user as an optional phrase to be sent to the first user.

One or more of the following example features may be included. The communication between the first user and the second user may include a real-time instant message. The attribute may include an enterprise associated with the second user. The attribute may include one or more characteristics associated with the second user. The attribute may include communication logs of one or more prior communications of the second user. Predicting the at least one conversational phrase may include predicting at least one conversational phrase of the first user before the first user has sent the at least one conversational phrase to the second user. The attribute may include seniority of the second user.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

FIG. 7 is an example diagrammatic view of a screen image displayed by a prediction process according to one or more example implementations of the disclosure.

Like reference symbols in the various drawings indicate like elements.

DETAILED DESCRIPTION

Figure 1:
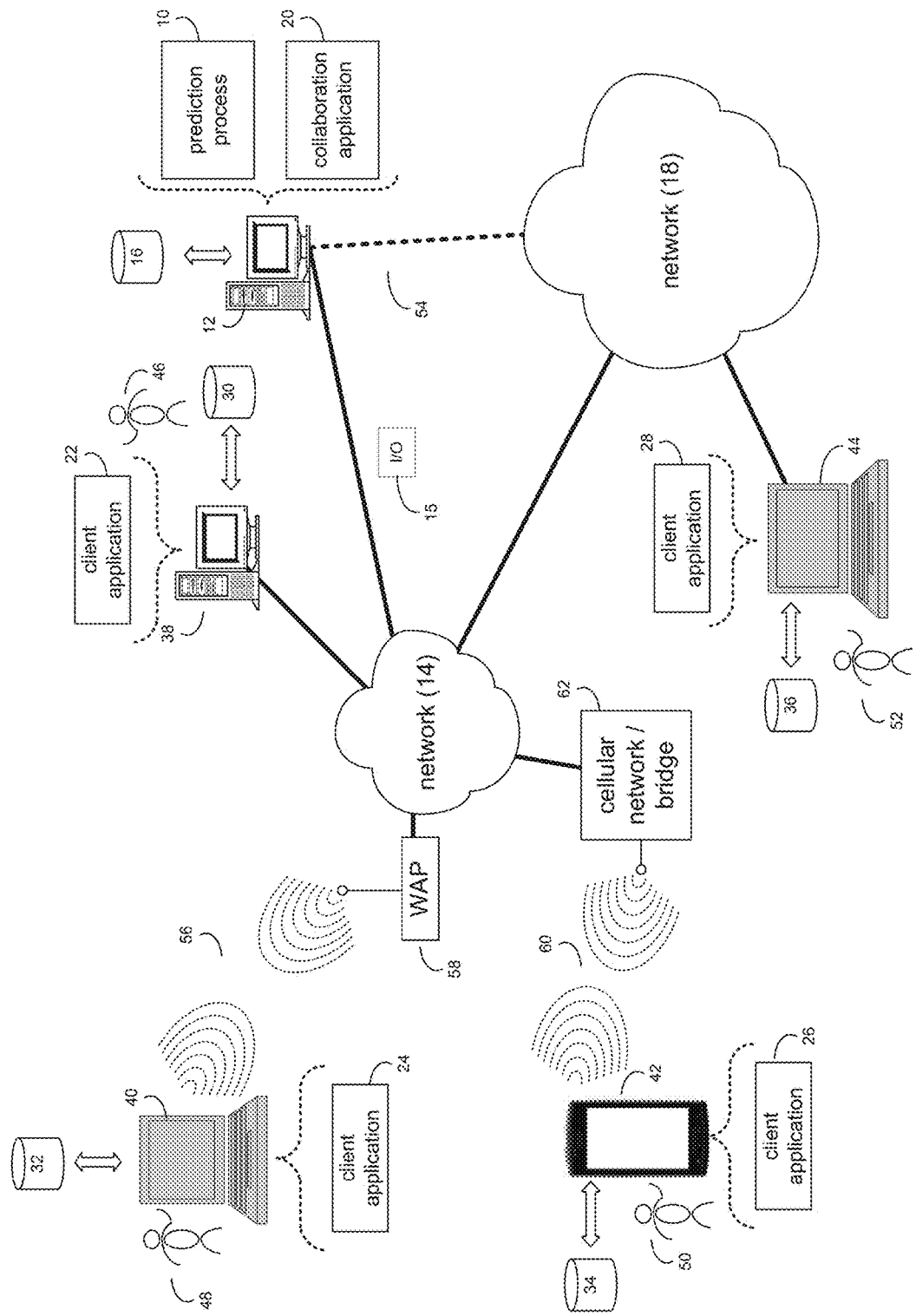
FIG. 1 is an example diagrammatic view of a prediction process coupled to an example distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electro-magnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown prediction process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a prediction process, such as prediction process 10 of FIG. 1, may identify, by a computing device, a model for predicting conversational phrases for a communication between at least a first user and a second user. The model may be trained based upon, at least in part, an attribute associated with the second user. At least one conversational phrase may be predicted for the communication between the first user and the second user. The at least one conversational phrase may be provided to the second user as an optional phrase to be sent to the first user.

In some implementations, the instruction sets and subroutines of prediction process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, prediction process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a collaboration application (e.g., collaboration application 20), examples of which may include, but are not limited to, e.g., a web conferencing application, a video conferencing application, a voice-over-IP application, a video-over-IP application, an Instant Messaging (IM)/"chat" application, an electronic mail (email) application, a search engine application, a short messaging service (SMS)/multimedia messaging service (MMS) application, or other application that allows for virtual meeting and/or remote collaboration.

In some implementations, prediction process 10 and/or collaboration application 20 may be accessed via one or more of client applications 22, 24, 26, 28. In some implementations, prediction process 10 may be a standalone application, or may be an applet/application/script/extension that may interact with and/or be executed within collaboration application 20, a component of collaboration application 20, and/or one or more of client applications 22, 24, 26, 28. In some implementations, collaboration application 20 may be a standalone application, or may be an applet/application/script/extension that may interact with and/or be executed within prediction process 10, a component of prediction process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of prediction process 10 and/or collaboration application 20. Examples of client applications 22, 24, 26, 28 may include, but are not limited to, e.g., a web conferencing application, a video conferencing application, a voice-over-IP application, a video-over-IP application, an Instant Messaging (IM)/"chat" application, an electronic mail (email) application, a search engine application, a short messaging service (SMS)/multimedia messaging service (MMS) application, or other application that allows for virtual meeting and/or remote collaboration, a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of prediction process 10 (and vice versa). Accordingly, in some implementations, prediction process 10 may be a purely server-side application, a purely client-side application, or a hybrid server-side/client-side application that is cooperatively executed by one or more of client applications 22, 24, 26, 28 and/or prediction process 10.

In some implementations, one or more of client applications 22, 24, 26, 28 may be configured to effectuate some or all of the functionality of collaboration application 20 (and vice versa). Accordingly, in some implementations, collaboration application 20 may be a purely server-side application, a purely client-side application, or a hybrid server-side/client-side application that is cooperatively executed by one or more of client applications 22, 24, 26, 28 and/or collaboration application 20. As one or more of client applications 22, 24, 26, 28, prediction process 10, and collaboration application 20, taken singly or in any combination, may effectuate some or all of the same functionality, any description of effectuating such functionality via one or more of client applications 22, 24, 26, 28, prediction process 10, collaboration application 20, or combination thereof, and any described interaction(s) between one or more of client applications 22, 24, 26, 28, prediction process 10, collaboration application 20, or combination thereof to effectuate such functionality, should be taken as an example only and not to limit the scope of the disclosure.

In some implementations, one or more of users 46, 48, 50, 52 may access computer 12 and prediction process 10 (e.g., using one or more of client electronic devices 38, 40, 42, 44) directly through network 14 or through secondary network 18. Further, computer 12 may be connected to network 14 through secondary network 18, as illustrated with phantom link line 54. Prediction process 10 may include one or more user interfaces, such as browsers and textual or graphical user interfaces, through which users 46, 48, 50, 52 may access prediction process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Figure 2:
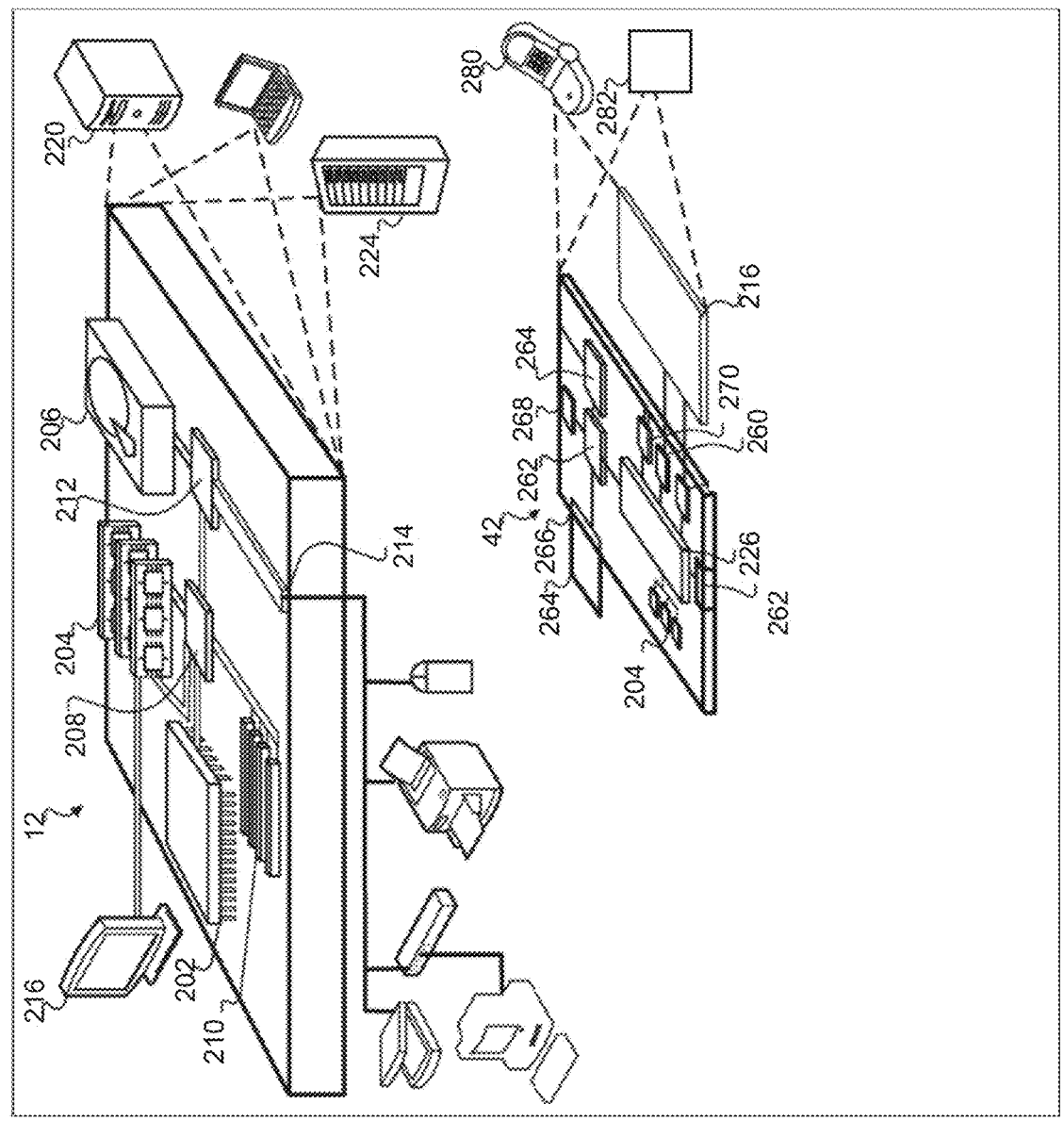
FIG. 2 is an example diagrammatic view of a computer and client electronic device of FIG. 1 according to one or more example implementations of the disclosure.
Figure 3:
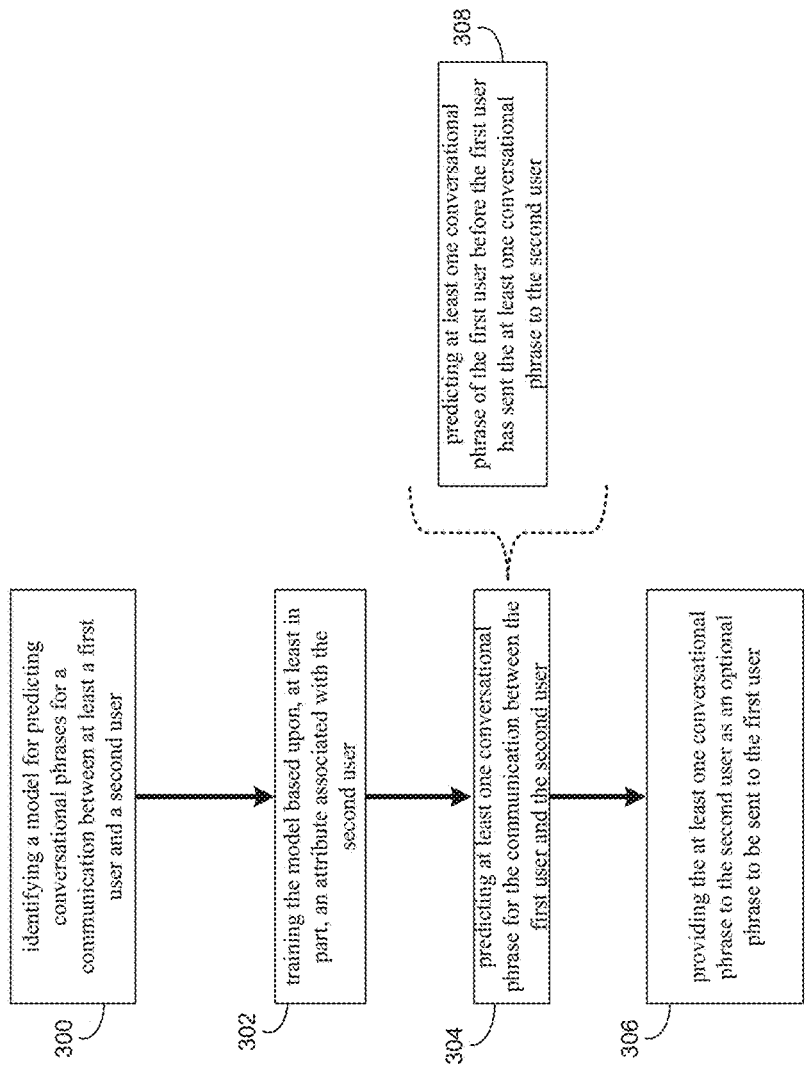
FIG. 3 is an example flowchart of a prediction process according to one or more example implementations of the disclosure.

Referring also to the example implementation of FIG. 2, there is shown a diagrammatic view of computer 12 and client electronic device 42. While client electronic device 42 and computer 12 are shown in this figure, this is for example purposes only and is not intended to be a limitation of this disclosure, as other configurations are possible. Additionally, any computing device capable of executing, in whole or in part, prediction process 10 may be substituted for client electronic device 42 and computer 12 (in whole or in part) within FIG. 2, examples of which may include but are not limited to one or more of client electronic devices 38, 40, and 44. Client electronic device 42 and/or computer 12 may also include other devices, such as televisions with one or more processors embedded therein or attached thereto as well as any of the microphones, microphone arrays, and/or speakers described herein. The components shown here, their connections and relationships, and their functions, are meant to be examples only, and are not meant to limit implementations of the disclosure described.

In some implementations, computer 12 may include processor 202, memory 204, storage device 206, a high-speed interface 208 connecting to memory 204 and high-speed expansion ports 210, and low speed interface 212 connecting to low speed bus 214 and storage device 206. Each of the components 202, 204, 206, 208, 210, and 212, may be interconnected using various busses, and may be mounted on a common motherboard or in other manners as appropriate. The processor 202 can process instructions for execution within the computer 12, including instructions stored in the memory 204 or on the storage device 206 to display graphical information for a GUI on an external input/output device, such as display 216 coupled to high speed interface 208. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

Memory 204 may store information within the computer 12. In one implementation, memory 204 may be a volatile memory unit or units. In another implementation, memory 204 may be a non-volatile memory unit or units. The memory 204 may also be another form of computer-readable medium, such as a magnetic or optical disk.

Storage device 206 may be capable of providing mass storage for computer 12. In one implementation, the storage device 206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 204, the storage device 206, memory on processor 202, or a propagated signal.

High speed controller 208 may manage bandwidth-intensive operations for computer 12, while the low speed controller 212 may manage lower bandwidth-intensive operations. Such allocation of functions is exemplary only. In one implementation, the high-speed controller 208 may be coupled to memory 204, display 216 (e.g., through a graphics processor or accelerator), and to high-speed expansion ports 210, which may accept various expansion cards (not shown). In the implementation, low-speed controller 212 is coupled to storage device 206 and low-speed expansion port 214. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Computer 12 may be implemented in a number of different forms, as shown in the figure. For example, computer 12 may be implemented as a standard server 220, or multiple times in a group of such servers. It may also be implemented as part of a rack server system 224. Alternatively, components from computer 12 may be combined with other components in a mobile device (not shown), such as client electronic device 42. Each of such devices may contain one or more of computer 12, client electronic device 42, and an entire system may be made up of multiple computing devices communicating with each other.

Client electronic device 42 may include processor 226, memory 204, an input/output device such as display 216, a communication interface 262, and a transceiver 264, among other components. Client electronic device 42 may also be provided with a storage device, such as a microdrive or other device, to provide additional storage. Each of the components 226, 204, 216, 262, and 264, may be interconnected using various buses, and several of the components may be mounted on a common motherboard or in other manners as appropriate.

Processor 226 may execute instructions within client electronic device 42, including instructions stored in the memory 204. The processor may be implemented as a chipset of chips that include separate and multiple analog and digital processors. The processor may provide, for example, for coordination of the other components of client electronic device 42, such as control of user interfaces, applications run by client electronic device 42, and wireless communication by client electronic device 42.

In some embodiments, processor 226 may communicate with a user through control interface 258 and display interface 260 coupled to a display 216. The display 216 may be, for example, a TFT LCD (Thin-Film-Transistor Liquid Crystal Display) or an OLED (Organic Light Emitting Diode) display, or other appropriate display technology. The display interface 260 may comprise appropriate circuitry for driving the display 216 to present graphical and other information to a user. The control interface 258 may receive commands from a user and convert them for submission to the processor 226. In addition, an external interface 262 may be provide in communication with processor 226, so as to enable near area communication of client electronic device 42 with other devices. External interface 262 may provide, for example, for wired communication in some implementations, or for wireless communication in other implementations, and multiple interfaces may also be used.

In some embodiments, memory 204 may store information within the Client electronic device 42. The memory 204 can be implemented as one or more of a computer-readable medium or media, a volatile memory unit or units, or a non-volatile memory unit or units. Expansion memory 264 may also be provided and connected to client electronic device 42 through expansion interface 266, which may include, for example, a SIMM (Single In Line Memory Module) card interface. Such expansion memory 264 may provide extra storage space for client electronic device 42, or may also store applications or other information for client electronic device 42. Specifically, expansion memory 264 may include instructions to carry out or supplement the processes described above, and may include secure information also. Thus, for example, expansion memory 264 may be provide as a security module for client electronic device 42, and may be programmed with instructions that permit secure use of client electronic device 42. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product may contain instructions that, when executed, perform one or more methods, such as those described above. The information carrier may be a computer- or machine-readable medium, such as the memory 204, expansion memory 264, memory on processor 226, or a propagated signal that may be received, for example, over transceiver 264 or external interface 262.

Client electronic device 42 may communicate wirelessly through communication interface 262, which may include digital signal processing circuitry where necessary. Communication interface 262 may provide for communications under various modes or protocols, such as GSM voice calls, SMS, EMS, or MMS speech recognition, CDMA, TDMA, PDC, WCDMA, CDMA2000, or GPRS, among others. Such communication may occur, for example, through radio-frequency transceiver 264. In addition, short-range communication may occur, such as using a Bluetooth, WiFi, or other such transceiver (not shown). In addition, GPS (Global Positioning System) receiver module 268 may provide additional navigation and location-related wireless data to client electronic device 42, which may be used as appropriate by applications running on client electronic device 42.

Client electronic device 42 may also communicate audibly using audio codec 270, which may receive spoken information from a user and convert it to usable digital information. Audio codec 270 may likewise generate audible sound for a user, such as through a speaker, e.g., in a handset of client electronic device 42. Such sound may include sound from voice telephone calls, may include recorded sound (e.g., voice messages, music files, etc.) and may also include sound generated by applications operating on client electronic device 42.

Client electronic device 42 may be implemented in a number of different forms, as shown in the figure. For example, it may be implemented as a cellular telephone 280. It may also be implemented as part of a smartphone 282, personal digital assistant, remote control, or other similar mobile device.

As discussed above, instant messaging (IM), or "chats" is a convenient method of communication between multiple people. Companies have adopted this technology to help address questions that a customer may have without requiring a phone call or email exchange with a customer service "agent." For example, a customer may go to a company's website, and a pop-up may appear asking if the customer wishes to communicate with an agent to ask a question. Once the user selects the option to communicate with the agent, a chat may appear where the customer and agent are then connected to begin a conversation. Some of these chats may take too much time for the agent to respond to the customer's question, or the agent may not be answering the question to the satisfaction of the customer. This may result in frustration on the part of the customer.

As will be discussed below, prediction process 10 may at least help, e.g., improve response prediction technology necessarily rooted in computer technology in order to overcome an example and non-limiting problem specifically arising in the realm of computer network communication associated with, e.g., real-time "live" chats. It will be appreciated that the computer processes described throughout are not considered to be well-understood, routine, and conventional functions.

The Prediction Process:

As discussed above and referring also at least to the example implementations of FIGS. 3-7, prediction process 10 may identify 300, by a computing device, a model for predicting conversational phrases for a communication between at least a first user and a second user. Prediction process 10 may train 302 the model based upon, at least in part, an attribute associated with the second user. Prediction process 10 may predict 304 at least one conversational phrase for the communication between the first user and the second user. Prediction process 10 may provide 306 the at least one conversational phrase to the second user as an optional phrase to be sent to the first user.

Figure 4:
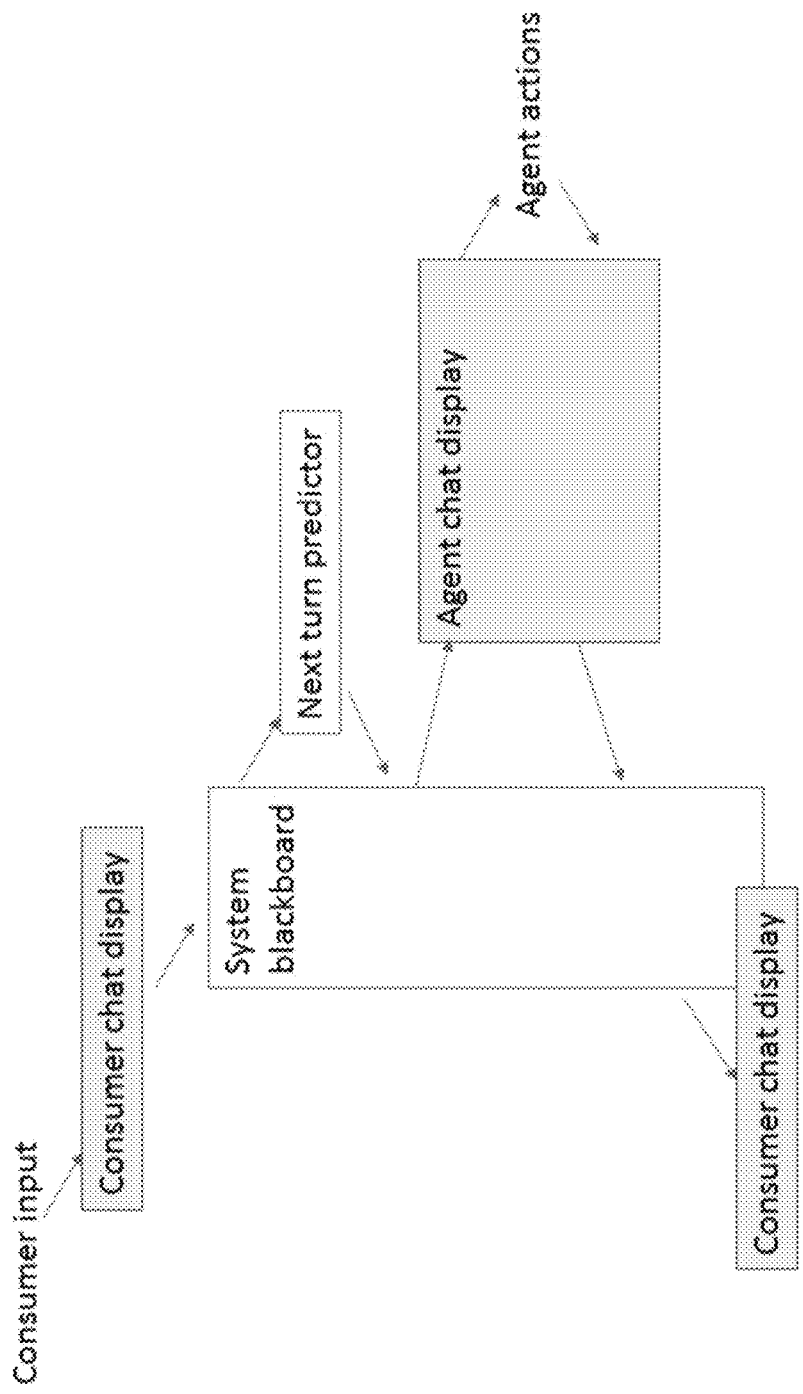
FIG. 4 is an example diagrammatic view of a live-chat system/flowchart that may be used by prediction process according to one or more example implementations of the disclosure.
Figure 5:
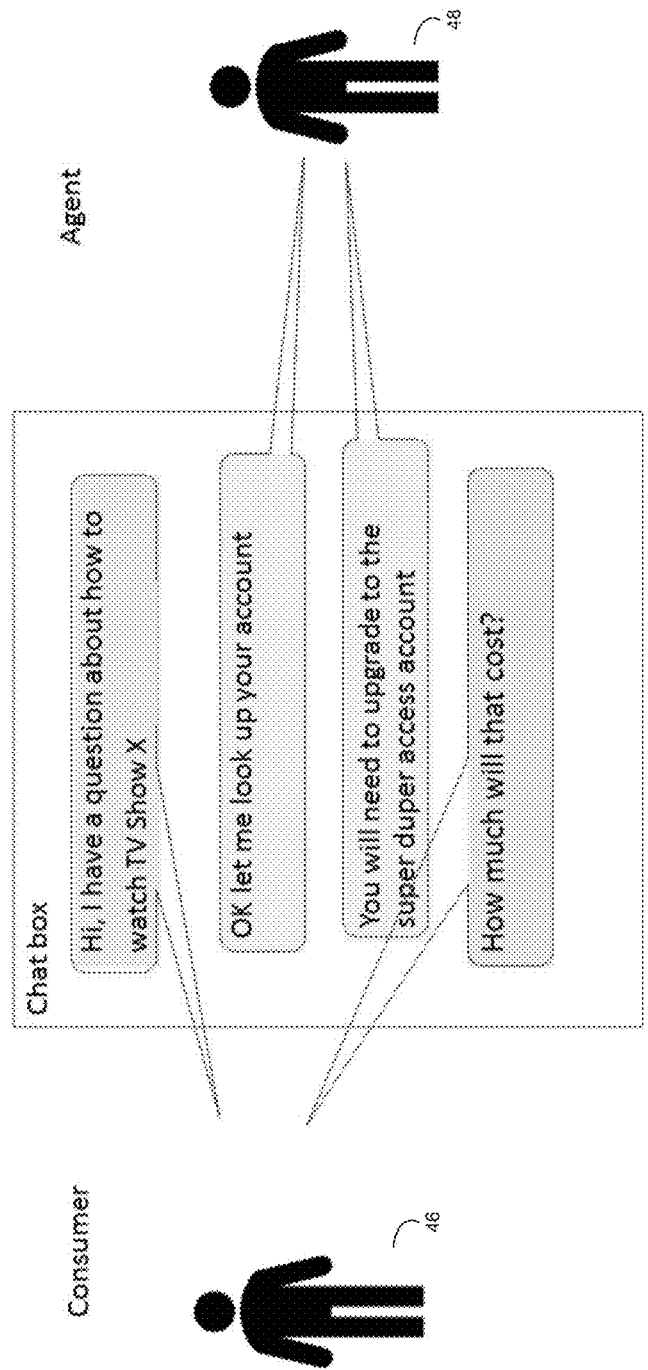
FIG. 5 is an example diagrammatic view of a screen image displayed by a prediction process according to one or more example implementations of the disclosure.
Figure 6:
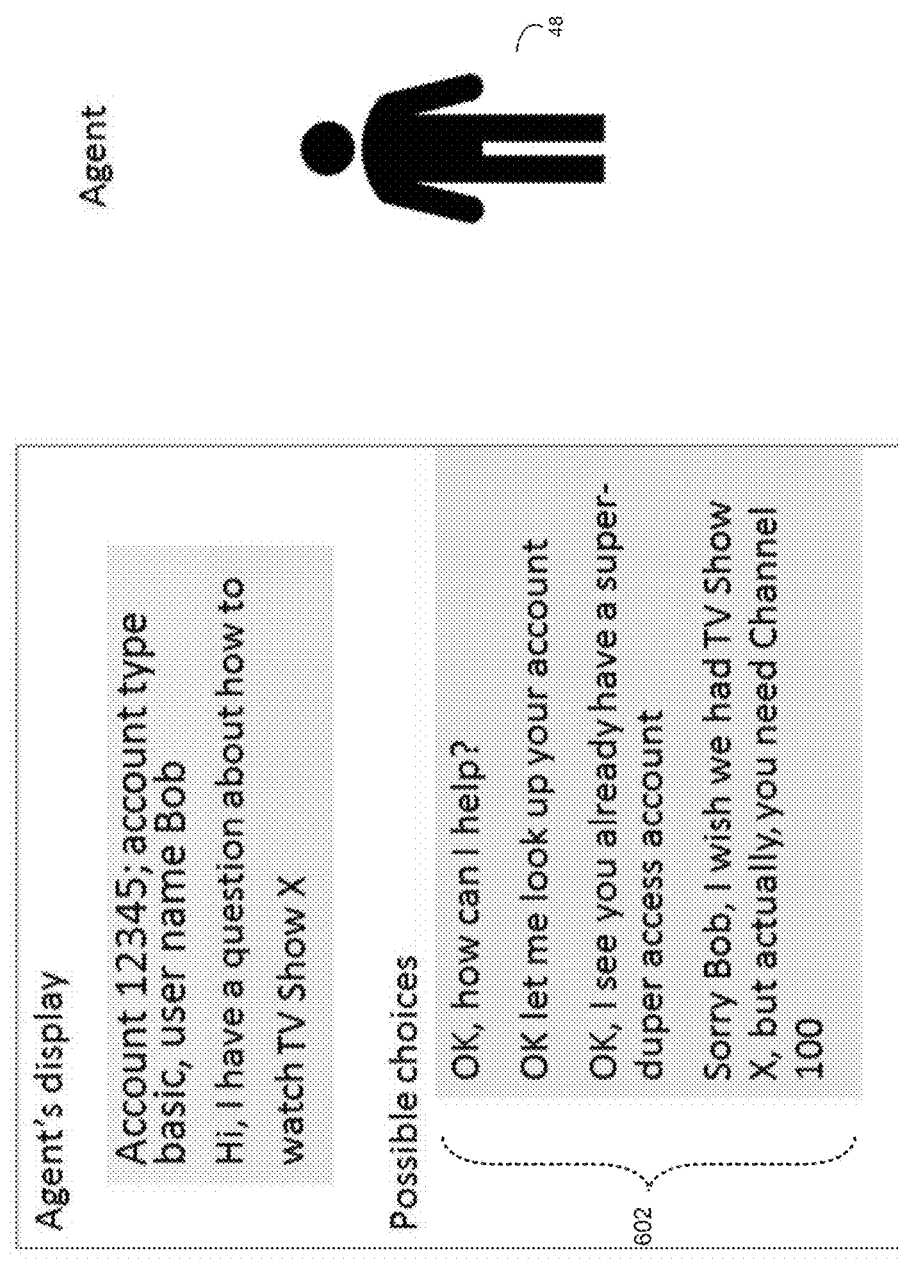
FIG. 6 is an example diagrammatic view of a screen image displayed by a prediction process according to one or more example implementations of the disclosure.

In some implementations, prediction process 10 may identify 300, by a computing device, a model for predicting conversational phrases for a communication between at least a first user and a second user. For instance, and referring at least to the example implementation of FIGS. 4 and 5, an example environment 400 and IM "chat" user interface 500 is shown. As seen in FIG. 4, the "system blackboard" may be a data structure that may be shared by some or all components so that they may share information. In this example, the agent (e.g., user 48), the customer (e.g., user 46), and prediction process 10 all have access to the full chat history so far. FIG. 4 also shows the flow of information from user 46 to user 48, and back to user 46, with the next turn predictor portion of prediction process 10 "eavesdropping" via seeing what is on the shared blackboard. In the example, assume for example purposes only that a first user (e.g., user 46) is a customer of a cable company (e.g., Company Y). Further assume that user 46 has a question regarding their subscription service, and initiates/receives a communication between user 46 and a second user (e.g., user 48 who may be a customer service agent of Company Y). As discussed throughout, in some implementations, the communication between user 46 and user 48 may include a real-time instant message (IM). While the disclosure includes examples of a real-time IM "chat," it will be appreciated that any type of synchronous conversation (chat) may be used without departing from the scope of the disclosure. Additionally, in some implementations, the communication may include, e.g., email, text, or any other type of textual (or voice) based communication using computing devices.

In the example, user interface 500 shows an example IM chat that may be seen from the perspective of user 46. Referring at least to the example implementation of FIG. 6, an example user interface 600 of the chat as seen from the perspective of user 48 is shown. In the example, user 46 says, "Hi, I have a question about how to watch TV Show X".

Continuing with the above example, prediction process may create a prediction model (or identify 300 an existing model), and may, given a chat history of one or more previous communications (e.g., chat log corpora) or the same current chat history, train 302 the model (e.g., using dialogs from chat-logs, train predictors to turn each chat-log into a series of pairs of <previous turns>, <agent response>), predict 304 one or more next agent response(s) 602 using the trained model, and provide 306 optional responses. For instance, given a chat history, and given some restrictions, prediction process 10 may predict 304 (and score) N agent responses 602 consistent with the restrictions. Such restrictions may include, for example, letters typed by user 48, as shown in the example implementation of FIG. 7. For instance, in some implementations, when predicting with restrictions, and for expediency, the predictions may be limited to filtering ranked hypothesized replies that do not include those restrictions (e.g., top K hypothesized replies consistent with the entered characters so far). In some implementations, prediction process 10 may deploy increasingly more expensive models to increasingly smaller sets of likely hypotheses to come up with the final ranking of potential responses. For instance, IR-based (agentTurns whose dialogContext minimized term frequency-inverse document frequency (TF-IDF) cosine distance to current dialogContext) fast match followed by NN ranker with hypotheses dynamically filtered by characters typed so far. For example, suppose there are, e.g., 100 k chats in a library, each with 10 turns. Scoring all 100 k×10=1M turns may take too long (or too much processing power, if parallelized) for the full turn prediction algorithm of prediction process 10. To save time or cost, prediction process 10 may start with a much less expensive approach that is recall-oriented: less precise and may often not have the correct choice in the highest scoring match, but often may have the correct choice in the top N (say N=100 or 1000). Instead of applying the full algorithm portion of prediction process 10 to 1M turns, prediction process 10 may only apply it to, e.g., 1000 turns that have been deemed potentially similar by the less expensive algorithm portion of prediction process 10. As noted above, TF-IDF may be used as a metric to judge similarity, which may be recall-oriented, and may be relatively inexpensive to run. In some implementations, prediction process 10 may use a succession of algorithms instead of just 2 (e.g., first window 1M turns to 100 k, then 100 k to 1 k, 1 k to 100, 100 to 10, and finally 10 to 1 to pick the final best turn.)

It will be appreciated that while prediction process 10 is described as training 302 the model, a separate training process associated with prediction process 10 may actually train 302 the model. That is, in some implementations, prediction process 10 may be associated with a separate training process used to train 302 the model, and in some implementations, prediction process 10 may include its own training process. As such, the description of prediction process 10 training the model should be taken as example only, and not to otherwise limit the scope of the disclosure.

Still referring to the example of FIG. 7, as user 48 enters the characters (e.g., via a keyboard) to answer the question of user 46, the potential responses that user 48 may send to user 46 that match the characters being entered are displayed or otherwise provided 306 to user 48 (e.g., via user interface 700a). For example, as user 48 begins to type the character "Y" when typing a response, and based upon the trained model and restriction of characters typed by user 48, prediction model may filter the previous responses down to those that fit the model/restriction (e.g., "You will need to upgrade to the super duper access account", "You are slightly behind on your payments", "You already have a super-duper access account)". In the example, "You will need to upgrade to the super duper access account" is predicted to be the highest scored response, and may be presented to user 48. In some implementations, this prediction model may be generally described as a "ranker." For instance, given a set of candidates, prediction process 10 may assign each a score, sort them in order of scoring (ranking), and choose the one with the highest score as the winning candidate. In some implementations, prediction process 10 may construct a training set by choosing a set of turns from a corpus of chat logs, and choosing as the correct (positive) exemplar the turn that follows the selected turn in the actual chat. Prediction process 10 may choose negative exemplars at random from other chats. The set of positive and negative exemplars may be presented to the learning algorithm portion of prediction process 10 to optimize the parameters of the model so that the model is most likely to rank the correct choice highest compared to the negative exemplars. One example of this may be a deep neural net using long-short-term memories (LSTMs), and trained using stochastic gradient descent. At run-time, the trained model (via prediction process 10) may assign a score according to its trained parameters, which should tend to rank the correct next turn higher than incorrect turns, given the preceding turns.

In some implementations, prediction process 10 may add to the restrictions, recalculate the predictions, and then provide 306 them to user 48 should a match exist. For instance, continuing with the example and as shown via user interface 700b, as user 48 continues to type the characters "You a" when typing the response, and based upon the model and restriction of characters typed/entered by user 48, prediction model may further filter the previous responses down to those that fit the model/restriction (e.g., "You already have a super-duper access account", "You are slightly behind on your payments"). In the example, "You already have a super-duper access account" is now predicted to be the highest scored response, and may be presented to user 48 as the response is being typed. In some implementations, user 48 may respond by accepting one proposed response, or typing more letters to create more restrictions (as noted above), or may partially accept a response, and edit it before sending. For example, user 48 (e.g., via prediction process 10) may "hand" select the best response being displayed (e.g., via a mouse pointer or touch screen), and in some implementations, may (e.g., via prediction process 10) select a particular key or icon (e.g., TAB or ENTER) to automatically select and enter the highest scored response as it is being typed.

Another example restriction that may be used by prediction process 10 may include characteristics of user 46 (e.g., account type). In the example, since the account type of user 46 is a TV subscription account, prediction process 10 may use the model to predict and score those responses specifically having to do with a TV subscription account type, and may filter out responses that are not associated with TV subscription accounts types.

Another example restriction that may be used by prediction process 10 may include characteristics of the situation (e.g., Company Y does not offer responses that cannot be satisfied, e.g., on a cable channel, do not offer shows that are already over, or if Company Y were an airline, do not offer flights to a place the airline does not go). It will be appreciated that other types of restrictions may also be used without departing from the scope of the disclosure.

Unlike a general mapping of chat histories to the "next turn" as a predictor, prediction process 10 may alternatively (and/or additionally) train 302 the model based upon, at least in part, an attribute associated with the second user (e.g., user 48), and predict 304 at least one conversational phrase (e.g., word or words or the rest of a previously entered response) for the communication between the first user (e.g., user 46) and user 48, and provide 306 the at least one conversational phrase to user 48 as an optional phrase to be sent to the first user.

For example, in some implementations, the attribute may include an enterprise associated with user 48 and/or the attribute may include one or more characteristics associated with user 48. For instance, prediction process 10 may create one or more new models for new enterprise (i.e., company or other entity type) customers by training a general model, and then adapting on data from the particular enterprise and/or for a particular agent, such as user 48. That is, the models may be metadata-aware, where the particular enterprise, department of the agent, agentID that identifies the particular agent in the conversation, time of day/week/year when the conversation is taking place, may be available to the training process allowing tailored agent response hypotheses. For example, the agentID (and/or other information) may be added to the input stream of tokens presented to the model at both training and run-time. For example, instead of "Hi, I have a question about how to watch TV Show X" (the actual text the customer entered), prediction process 10 may add the agent token "Hi, I have a question about how to watch TV Show X <agent456>". This may allow the model (via prediction process 10) to associate a particular style or domain of expertise with the agentID and thus make it more likely to choose a response appropriate to the task. In some implementations, prediction process 10 may also create specific inputs to the model for such metadata. It will be appreciated that many potential types of metadata may be used without departing from the scope of the present disclosure.

In some implementations, regarding predicting responses leveraging entity instances specific to the dialog (e.g., the distribution of individual instances are not learned from the population data, only the classes), prediction process 10 may predict dialog context dependent named entities in a retrieval(ranker)-based system, as opposed to a generative system (e.g., where an NN LM with attention and explicit copy mechanism may be used to achieve similar goals). A naïve implementation generally would not allow the prediction of specific entities referenced previously in the chat when those entities were not observed in training and/or are highly conditioned on the entities observed in that chat, e.g., a person's name or a specific amount.

In some implementations, when leveraging entity instances specific to the dialog, prediction process 10 may preprocess the training data with a named entity recognizer (NER) and may replace entities with their types as a placeholder, e.g., "So we'll move <amount> from savings to checking." These templatized candidates may then be what is retrieved/ranked during training/run-time by prediction process 10. Further, to differentiate named entities (NEs) that may appear in the recent context vs. older context, prediction process 10 may use "<amount-k>" and "<name-k>" where "k" would be an actual number indicating that the entity should be instantiated/rendered with the $k^{th}$ most recently observed entity of that type in the dialog context (e.g., k:=0 if the entity value was never seen in context). Below are some examples how this may be done in training/run time:

Training:
  a. Dialog
    i. S1: hi jane this is tom how can I help you
    ii. U: I'd like to wire $500 to my Aunt Mary
    iii. S2: very nice of you jane I can help you wire $500 to Aunt Mary
    iv. S3: what is Aunt Mary's account number
  b. Dialog after NER
    i. S1: hi <name> [jane] this is <name>[tom] how can I help you
    ii. U: I'd like to wire <amount>[$500] to my <name> [Aunt Mary]
    iii. S2: very nice of you <name> [jane] I can help you wire <amount> [$500] to <name> [Aunt Mary]
    iv. S3: what is <name> [Aunt Mary]'s account number
  c. Training data created for the agent turn S2:
    i. Context
      1. S1: hi <name-3> [jane] this is <name-2>[tom] how can I help you
      2. U: I'd like to wire <amount-1> [$500] to my <name-1>[Aunt Mary]
    ii. Agent turn to be predicted
      1. S2: very nice of you <name-3> I can help you wire <amount-1> to <name-1>
  d. Training data created for the agent turn S3:
    i. Context
      1. S1: hi <name-5> [jane] this is <name-4>[tom] how can I help you
      2. U: I'd like to wire <amount-2>[$500] to my <name-3>[Aunt Mary]
      3. S2: very nice of you <name-2> [jane] I can help you wire <amount-1> [$500] to <name-1> [Aunt Mary]
    ii. Agent turn to be predicted
      1. S3: what is <name-1> [Aunt Mary]'s account number Run time:
  a. Prediction process 10 may then use the same NER at run time to process the dialog context in run time, and if prediction process 10 predicts "what is <name-1>'s account number" for S3, prediction process 10 may look for the most recent occurrence of <name> in the dialog history, which in the example is found to be "Aunt Mary", and then fulfill or provide the sentence to get "what is Aunt Mary's account number".

In some implementations, models may be trained on less specific data, and then fine-tuned by prediction process 10 on increasingly more specific data (e.g., transfer learning; adaptation) and/or these may be (projected) inputs to a shared model (e.g., with dedicated parameter subsets, ala LHN/LIN). For example, assume for instance that there are two customers, one is a B(bank) and the other one is e-commerce (E). Prediction process 10 may have already collected data for B and now is about to train a model for E. These 2 customers may have something in common, e.g, close/open accounts, report stolen account credential etc. and may be very different as well. Prediction process 10 may leverage the data in B when training models for E. One example way to do it is starting with a model trained with B data, and then continue to train the model with a few more epochs with data from E, and this is generally called 'fine tuning'. To explicitly address the difference in the two applications, prediction process 10 may either add transformation in the input layer (e.g., linear input network) or add transformation in the layers before the output layer but after the input layer (e.g., linear hidden network) when fine tuning the models using data from E.

In some implementations, the attribute may include communication logs of one or more prior communications of the second user (e.g., user 48). For example, pre-delivery of the predictions, prediction process 10 may use chat logs (only) to train a model to score predictions; however, post-delivery, prediction process 10 may factor in the interactions of the agents. For example, chat logs may still be used, but the associated data may be enriched by agent user interface logs where prediction process 10 may retain, e.g., (1) what was presented to the agents, (2) what response was selected (if any), and/or (3) how was the response modified by the agent before being sent. For example, before deploying such a system, all that may be had for training is what an agent replies with in a given chat context. To train a discriminative model, prediction process 10 may randomly choose from other agent turns, pushing the model to score the observed turn higher than these alternatives. Note some of these alternatives, despite not exactly matching the observed agent reply, may have been acceptable to the agent. After being deployed, prediction process 10 may not only have what an agent replies with, but what alternatives the system may be exposed to him/her and thus what s/he has implicitly rejected (when not equal to agent reply). These alternatives may be mined to focus the model better than random ones and there may be evidence that the agent deemed them not acceptable.

Moreover, in some implementations, the training adaptation may be used to capture data on machine actions. For example, prediction process 10 may make agent predictions that are capable of accessing enterprise data (e.g., a response like <Your account balance is $ACC_BAL> provided by user 48 may be rendered alternatively to the user interface of user 46 as "Your account balance is $123.45." In some implementations, similarly, prediction process 10 may increase the privacy and security of the overall communication system by, e.g., hiding some of these identified quantities from the agent. Thus, prediction process 10 may present user 46 saying "my ssn is 123-45-6789" to user 48 alternatively as "my ssn is <SSN number>"; and similarly for other sensitive information such as, e.g., account numbers, credit card numbers, account balances, etc.

As another example, prediction process 10 may have the attributes of actions of user 48 logged so that prediction process 10 may predict (agentAction, agentReply) pairs and the agentReply may depend on values extracted from the agentAction. For instance, agentAction may include a write operation (e.g., transfer funds) as opposed to only read operations (e.g., check account balance of user 46). For example, prediction process 10 may predict a pair of (agentAction, agentReplyPattern). For example, agentAction='$balance=read_account(number=123, attribute=balance' and the agentReplyPattern='your balance is $balance'. The user action may be automatically conducted (e.g., by prediction process 10) or may require some manual intervention of the agent, and once the customer's balance is retrieved, the agent may need to fill in the balance value in the predicted reply pattern and send back to the user. In some implementations, the agent (e.g., via prediction process 10) may trigger the selected action and reply as a single step, more typically, the action may be triggered and the reply may then be fully instantiated (e.g., "balance is $balance"->"balance is $1000") and may then be propagated (or first edited) by the agent (e.g., via prediction process 10).

As another example, prediction process 10 may train/adapt models specific to the agents as the attribute metric (e.g., #ofkeystrokes) that may improve even further when prediction process 10 models user-specific actions. For instance, if an agent consistently adds "and have a great day!" to close a chat, or has a personal way of apologizing, prediction process 10 may capture that information, and may provide such predictions to user 48. For example, prediction process 10 may train train/adapt the model per agent. Generally, prediction process 10 may train a model using all the available chat logs. For agents from whom there may be many chat logs, prediction process 10 may adapt a special model for each one of them to capture special behaviors, such as those described above.

In some implementations, the attribute may include seniority of the second user. For instance, a result of offering potential agent responses may be to improve the agent's training, and the quality of their responses to customers (e.g., user 46). For example, prediction process 10 may limit training to or emphasize (weight) the historical chats involving a subset of more senior/skilled agents or filter/de-emphasize (de-weight) new/novice agents. As such, responses entered and/or selected by more senior/skilled agents may be ranked higher than those entered and/or selected by new/novice agents. For example, prediction process 10 may derive the agents' seniority based on their profile. For example, their job title, the consumer satisfaction rate, the job starting date, etc. When training the models, prediction process 10 may prefer chat logs from more senior agents than novice agents. In some implementations, this may be done by only training the model using chat logs from agents whose seniority measurement exceeds a certain threshold (e.g., agents must have worked for more than 6 months). However, it will be appreciated that other techniques and profile characteristics for training may be used without departing from the scope of the disclosure.

In some implementations, predicting 304 the at least one conversational phrase may include predicting 308 at least one conversational phrase of the first user (e.g., user 46) before the first user has sent the at least one conversational phrase to user 48. For example, to help decrease latency of the agent prediction at the cost of extra computation, prediction process 10 may predict 308 a number of possible consumer (e.g., user 46) responses, and then calculate the agent responses to these possible consumer responses. In the example, if user 46 does indeed enter one of the possible consumer responses, prediction process 10 may save latency, as the agent (user 48) response for that turn may not need to be recalculated. In some implementations, the same method may be used to train a model to predict the customer (e.g., consumer) response, and prediction process 10 may partition the chat log in a way to focus on the consumer response. For instance, assuming the chat log "agent1, consumer1, agent2, consumer2", the training data for predicting agent response may be "empty→agent1", "agent1+consumer1→agent2", and the training data for predicting consumer response may be "agent1→consumer1", "agent1+consumer1+agent2→consumer2". The reason for latency saving may be by looking a few steps forward, similar to playing chess. Using the same examples, after predicting "agent1", and as consumer is entering his/her response, prediction process 10 may also predict "consumer1" based on the predicted "agent1", and may then predict the "agent2" based on the predicted "agent1" and predicted "consumer1". If the consumer enters the same (or very similar) response as what has been predicted, then it may be known that the predicted "agent2" may be what is needed. While in some implementations, prediction process 10 may do this when the user has already started typing something that will then have to be responded to, it will be appreciated that this may also be done to make predictions without any further observation and then predicting the agent response.

In some implementations, prediction process 10 may predict user responses so as to speed up entering their reply and to improve agent predictions by reducing variation of user inputs observed (e.g., since users may tend to choose a provided response if the provided response is semantically consistent with the information they want to convey). This may be a simpler interface than the one presented to the user (e.g., enabling less/1 hypothesis), and may be accomplished similarly to predicting and providing the responses of the agent.

In some implementations, prediction process 10 may show the predictions of user 48 to user 46, similarly to how the predictions are provided to user 48. In the example, if user 46 finds some particularly apt, user 46 may accept them (e.g., before user 48 actually sends the response to user 46) and move the conversation forward at a faster pace.

In some implementations, for example, when adapting/training models, prediction process 10 may add a "recency bias," so that prediction process 10 may adapt to, e.g., policy changes, product recalls, data leaks, etc. (e.g., of Company Y) and the like. For instance, in some implementations, there may be two models, one (A) trained on all the chat logs, and one (B) trained on only the chat logs in the past 2 weeks. In the example, if there is no special event happening, using A is may be enough. In another example, if there is a serious recall from the company, many customers may be asking about how to do it. In the example, prediction process 10 may interpolate the results from A and B and give a strong bias to B, e.g., result=0.3A+0.7B.

In some implementations, in order to decrease latency, prediction process 10 may not treat each prediction computation de novo (i.e., as a new computation from the beginning without a previous computation). Instead, prediction process 10 may maintain the model state from the previous computations in the dialog. For example, assume the following conversation: agent1, client1, agent2, client2, agent3, client3, agent4. Prediction process 10 may use LSTM to do sentence encoding. When predicting agent2, prediction process 10 may use agent1+client1 as the context, so LSTM(agent1+client1) output the current state, and when predicting agent3, the current state may be computed using LSTM(agent1+client1+agent2+client2). As can be seen, prediction process 10 may either directly compute LSTM (agent1+client1+agent2+client2) and this may be expensive to do, or prediction process 10 may save the internal state of the LSTM and only need to compute LSTM(LSTM(agent1+ client1)+agent2+client2), which may be more efficient. Moreover, in some implementations, prediction process 10 may "stream" computations as the user types, which may similarly involve saving some prior model states to recover from deletions. For example, in some implementations, whenever the user typed a word, prediction process 10 may update the LSTM state and save it to memory, so LSTM states may be computed as agent/user are typing. In some implementations, prediction process 10 may not only save the current LSTM state, but may also save the most recent LSTM states up to a certain number, so if the agent/user deletes a few words, prediction process 10 may quickly back off to the previous states. For example, if the agent types "how are your today", prediction process 10 may save LSTM(history+how), LSTM(history+how+are), LSTM(history+how+are+your) and LSTM(history+how+are+your+ today). The agent may quickly realize that 'your' should be 'you', then he/she may delete the last two words and because prediction process 10 has saved the recent states, prediction process 10 may instantly switch back to LSTM(history+ how+are) without recomputing anything.

In some implementations, the present disclosure may be utilized as voice-to-voice chats, implemented as Automated Speech Recognition (ASR) to text, where prediction process 10 may process the chats as text, and utilize Text to Speech (TTS) for the results. That is, the present disclosure may be extended to speech-to-speech by, e.g., applying an ASR portion of prediction process 10 to the input speech (e.g., of user 46 and/or user 48) and TTS to typed agent responses. As such, the description of using a strictly text based approach should be taken as example only and not to otherwise limit the scope of the present disclosure. Similarly, in some implementations, prediction process 10 may train the text based model from the inputs of the audio chats, by transcribing the result to text, and using the result as training data.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
   identifying, by a computing device, a model for predicting conversational phrases for a communication between at least a first user and a second user;
   training the model using long-short term memories (LSTMs) based upon, at least in part, an attribute associated with the second user;
   predicting at least one conversational phrase for the communication between the first user and the second user based upon, at least in part, the model and the attribute associated with the second user, wherein the attribute includes a modification, by the second user, with a previously predicted conversational phrase provided to the second user, wherein the modification includes a deletion of one or more elements of the predicted at least one conversational phrase;
   providing the at least one conversational phrase to both the first user based upon the LSTMs being updated with the modification and the modification being stored in a memory and the second user as an optional phrase before the second user has sent the at least one conversational phrase to the first user; and
   sending at least one of the at least one conversational phrase and another conversational phrase to the first user based upon, at least in part, providing the at least one conversational phrase to both the first user and the second user as the optional phrase.

2. The computer-implemented method of claim 1 wherein the communication between the first user and the second user includes a real-time instant message.

3. The computer-implemented method of claim 1 wherein the attribute includes an enterprise associated with the second user.

4. The computer-implemented method of claim 1 wherein the attribute includes one or more characteristics associated with the second user.

5. The computer-implemented method of claim 1 wherein the attribute includes communication logs of one or more prior communications of the second user.

6. The computer-implemented method of claim 1 wherein predicting the at least one conversational phrase includes predicting at least one conversational phrase of the first user before the first user has sent the at least one conversational phrase to the second user.

7. The computer-implemented method of claim 1 wherein the attribute includes seniority of the second user.

8. A computer program product residing on a non-transitory computer readable storage medium having a plurality of instructions stored thereon which, when executed across one or more processors, causes at least a portion of the one or more processors to perform operations comprising:
 identifying, by a computing device, a model for predicting conversational phrases for a communication between at least a first user and a second user;
 training the model using long-short term memories (LSTMs) based upon, at least in part, an attribute associated with the second user;
 predicting at least one conversational phrase for the communication between the first user and the second user based upon, at least in part, the model and the attribute associated with the second user, wherein the attribute includes a modification, by the second user, with a previously predicted conversational phrase provided to the second user, wherein the modification includes a deletion of one or more elements of the predicted at least one conversational phrase;
 providing the at least one conversational phrase to both the first user based upon the LSTMs being updated with the modification and the modification being stored in a memory and the second user as an optional phrase before the second user has sent the at least one conversational phrase to the first user; and
 sending at least one of the at least one conversational phrase and another conversational phrase to the first user based upon, at least in part, providing the at least one conversational phrase to both the first user and the second user as the optional phrase.

9. The computer program product of claim 8 wherein the communication between the first user and the second user includes a real-time instant message.

10. The computer program product of claim 8 wherein the attribute includes an enterprise associated with the second user.

11. The computer program product of claim 8 wherein the attribute includes one or more characteristics associated with the second user.

12. The computer program product of claim 8 wherein the attribute includes communication logs of one or more prior communications of the second user.

13. The computer program product of claim 8 wherein predicting the at least one conversational phrase includes predicting at least one conversational phrase of the first user before the first user has sent the at least one conversational phrase to the second user.

14. The computer program product of claim 8 wherein the attribute includes seniority of the second user.

15. A computing system including one or more processors and one or more memories configured to perform operations comprising:
 identifying, by a computing device, a model for predicting conversational phrases for a communication between at least a first user and a second user;
 training the model using long-short term memories (LSTMs) based upon, at least in part, an attribute associated with the second user;
 predicting at least one conversational phrase for the communication between the first user and the second user based upon, at least in part, the model and the attribute associated with the second user, wherein the attribute includes a modification, by the second user, with a previously predicted conversational phrase provided to the second user, wherein the modification includes a deletion of one or more elements of the predicted at least one conversational phrase;
 providing the at least one conversational phrase to both the first user based upon the LSTMs being updated with the modification and the modification being stored in a memory and the second user as an optional phrase before the second user has sent the at least one conversational phrase to the first user; and
 sending at least one of the at least one conversational phrase and another conversational phrase to the first user based upon, at least in part, providing the at least one conversational phrase to both the first user and the second user as the optional phrase.

16. The computing system of claim 15 wherein the communication between the first user and the second user includes a real-time instant message.

17. The computing system of claim 15 wherein the attribute includes an enterprise associated with the second user.

18. The computing system of claim 15 wherein the attribute includes at least one of one or more characteristics associated with the second user and communication logs of one or more prior communications of the second user.

19. The computing system of claim 15 wherein predicting the at least one conversational phrase includes predicting at least one conversational phrase of the first user before the first user has sent the at least one conversational phrase to the second user.

20. The computing system of claim 15 wherein the attribute includes seniority of the second user.

* * * * *